United States Patent Office 3,208,886
Patented Sept. 28, 1965

3,208,886
ELECTRIC ARC WELDING FLUX AND METHOD OF ELECTRIC ARC WELDING
James M. Reilley, Philadelphia, and Walter H. Wooding and Thomas J. Moore, Broomall, Pa., assignors to Arcos Corporation, Philadelphia, Pa., a corporation of Pennsylvania
No Drawing. Filed July 31, 1962, Ser. No. 213,575
8 Claims. (Cl. 148—26)

The present invention relates to fluxes for electric arc welding of nickel base alloys and of wholly austenitic iron base alloys. The invention also relates to methods of electric arc welding of such alloys.

A purpose of the invention is to avoid cracking in the weld bead in welding of nickel base alloys and wholly austenitic iron base alloys, particularly in overlaying on plain carbon steel when an inevitable pickup of impurities may occur.

A further purpose is to avoid cracking in the weld bead in butt welding of nickel base alloys and iron base alloys which are entirely austenitic.

A further purpose is to permit welding between ferritic iron base alloys and nickel base alloys or wholly austenitic iron base alloys without danger of cracking in the bead.

A further purpose is to promote the wetting action between the molten metal of the weld and the base molten metal so as to aid in obtaining smoother weld beads by the action of the slag in purifying the weld metal and the surface of the base metal.

A further purpose is facilitate cleaving ar nonadhesion between the slap and weld bead so that the slag can readily be removed, either for self removing or by detaching itself when the weld bead is lightly tapped with hand tools.

A further purpose in nickel base alloys and in wholly austenitic iron base alloys is to purify the weld bead in electric arc welding so as to obtain low contents of sulphur, phosphorus, oxygen and silicon to as to avoid the formation of the low melting ingredients which will produce poor workability in the weld bead, and which may cause the weld bead to fracture when the weld is restrained.

A further purpose is to make an arc welding flux for use in welding nickel base alloys and alloys of iron which are wholly austenitic and which flux is essentially composed of magnesium oxide in relatively large proportion, aluminum oxide in relatively small proportion, and much less than the proportion required to make a neutral slag, with substantial quantity of fluorspar, the slag being thus highly basic and very effective in removing sulphur and phosphorus from the weld including sulphur and phosphorus picked up from the base metal, and effective in protecting against introduction of oxygen because of the presence of fluorspar.

A further purpose is to employ a small amount, preferably 6% and not exceeding 10% of silica in the flux so as to avoid the possibility that silica will be reduced to silicon and picked up by the weld bead, and then embrittle the weld bead, and preferably to add to the flux sufficient columbium to equal or exceed ten times the permissible silicon in the weld bead. Thus, the quantity of columbium in the flux should be in range from one to five percent by weight for best results.

A further purpose is to produce a flux which is prefused and has all the ingredients bound together by the prefusion so that the use of a binder is not necessary. This has the advantage of cutting down the necessary quantity of silica and thus avoiding the likelihood that silicon might be produced by the deoxidizers and undesirably enter the weld metal.

Further purposes appear in the specification and in the claims.

In the prior art extensive use has been made of nickel base alloys by which is meant those containing fifty percent or more of nickel, including commercial nickel, Monel, Inconel of various forms, and also cupronickel, a copper alloy which may contain 30 percent of nickel.

The following is a typical analysis for Inconel.

Table 1

| Element: | Percentage |
|---|---|
| Carbon | 0.07 |
| Manganese | 3.50 |
| Silicon | 0.30 |
| Sulphur | 0.01 |
| Phosphorus | 0.01 |
| Chromium | 16.00 |
| Nickel | Balance |
| Columbium | 1.50 |
| Iron | 6.00 |
| Oxygen | .02 |

Monel is 33.3% copper and 66.6% nickel.

These alloys have been used both to join nickel base alloys, to join plain carbon and low alloy steels, and also to overlay the surface, in which case they may be initially applied to plain carbon or low alloy steels, but any succeeding beads will be applied on themselves or other nickel base alloys. In such electric arc welding applications, extensive difficulty has been encountered through the tendency of the weld bead to either crack in the process of formation or to have objectionable discontinuities. These defects are sometimes described as fissures, sometimes as hot cracks, and sometimes when they take the form of porosity in the weld bead.

Similar defects are encountered in the wholly austenitic iron base alloys, that is, those that have substantially no ferritic component. This would be true of alloys of 25% chromium, 20% nickel, balance iron and alloys containing more chromium plus nickel such as the alloy of 15% chromium, 35% nickel, balance iron. These alloys are found in the stainless steels, types 300 (not 18% chromium, 8% nickel).

Observations of the difficulties encountered and research conducted by the present inventors appear to indicate that these defects, which are particularly evident when the weld members are subject to partial or complete restraint, are largely traceable to the introduction into the weld bead of impurities such as phosphorus, sulphur, oxygen and silicon.

In fact nickel alloys and wholly austenitic iron base alloys appear to be much more sensitive to hot cracking or hot shortness due to the presence of such ingredients.

In the present invention it is desired to produce a flux which can be introduced to the weld pool in any one of several ways. The flux may be a granulated composition supplied to the weld pool by mechanical feeding or by blowing. It may also be a coating applied to an electric arc welding electrode, or it may be a core or internal component in a flux cored arc welding electrode or a flux cored cold wire added to an eletcric arc weld. The flux may also be introduced in any one of a variety of other methods. The electric arc welding flux and method of the invention may be applied to manual or automatic or semi-automatic application of a single arc in arc welding or it may involve a plurality of simultaneously maintained arcs, and the arc may be direct current or alternating current or a combination and if direct current may be any desired polarity.

In accordance with the invention, the flux essentially embodies the following ingredients:

The flux contains 15 to 30% magnesium oxide, preferably about 27% of magnesium oxide by weight.

This of course, makes the flux strongly basic, as the content of aluminum oxide is between 5 and 13% preferably about 9% by weight.

The magnesia should preferably be at least three times the alumina content so as to assure adequate basicity of the slag.

In addition 10 to 40% by weight of fluorspar is employed, preferably about 25%.

These ingredients cooperate in the preferred embodiment, with other ingredients which are desirably added and are mentioned below.

The magnesia and the alumina form a highly basic slag which tends to remove sulphur and phosphorus to a level in the weld bead which is in each case below 0.010% and preferably below 0.005% by weight.

The fluorspar cooperates with the magnesia-alumina system by tending to lower the melting point of the flux to a value below the melting point of the nickel base alloys or wholly austenitic iron base alloys concerned, protecting against introduction of oxygen into the weld so that oxygen content in the weld can be reliably maintained below 0.05% by weight, by increasing the activity of the magnesia and lime, if any, and therefore making the slag effectively more basic, and by decreasing the viscosity of the slag.

Magnesia and alumina should be used that will not be high in silica as it is desired to keep silicon in the weld bead below 0.35%, preferably below 0.20% and most desirably below 0.10% for elimination of the tendency to hot cracking and fissuring.

The flux will preferably contain from zero to 22% of limestone, and most desirably about 17% of limestone. The limestone used should have a purity of at least 97% $CaCO_3$ by weight, and therefore has a low silica content. Likewise, the magnesium oxide used has a purity of 97% MgO by weight so as to avoid silica which may be objectionable and also to avoid zirconium oxide which is believed to be objectionable. Experiments indicate that the use of low purity MgO containing substantially greater zirconium oxide and silica produces objectionable effects through hot cracking of the weld bead. The alumina has a purity of at least 95% by weight.

It will be evident of course that the evolution of carbon dioxide from the limestone during the welding tends to provide a gaseous path easily ionized to stabilize and support the arc.

It is very desirable to use columbium in the flux, in order to combine with and tie up silicon which may be reduced by deoxidizers. We prefer to employ from one to five percent of columbium and preferably add it as ferrocolumbium (about 50% columbium by weight) in the proportions of 0 to 10% and preferably 2 to 10%, and most desirably about 4% by weight of the flux.

It is very desirable in many cases to enrich the weld by alloys which may be depleted in welding, and therefore for Inconel overlays we preferably add zero to 20% and preferably about 10% of nickel by weight in the form of nickel powder, zero to 20% preferably about 10% chromium by weight and zero to 15% and preferably about 6% of manganese by weight, preferably as electrolytic manganese. Manganese may protect against harm from sulphur and also improve the hot ductility of the weld bead. The flux in many cases also includes suitable deoxidizers such as aluminum, vanadium or magnesium in a quantity of zero to 10% by weight.

It will be evident that the conditions prevailing in the electric arc welding pool will produce a temperature of the order of 1800 to 2000 degrees C. or higher with suitable stirring in which the reaction above described can be obtained.

The following table gives a typical and preferred composition for the flux:

Table 2

| | Range, percent by weight | Preferred, percent by weight |
|---|---|---|
| Fluorspar | 10 to 40 | 25 |
| Magnesium oxide | 15 to 39 | 27 |
| Aluminum oxide | 5 to 13 | 9 |
| Limestone | 0 to 22 | 17 |
| Ferrocolumbium (50% Cb) | 2 to 10 | 4 |
| Metallic Manganese Powder | 0 to 15 | 6 |
| Nickel Powder | 0 to 20 | 10 |
| Chromium Powder | 0 to 20 | |
| Deoxidizer (Al, Va or Mg) | 0 to 10 | |
| Bentonite | 0 to 3 | 2 |

The flux is made up by mixing together the powdered ingredients, preferably adding about 0 to 3% and desirably about 2% by weight of bentonite as an agglomerate binder which may be a limited and desirably employing a binder which may be a limited quantity of sodium silicate having a ratio of $Na_2O$ to $SiO_2$ of 1 to 3.22 this composition being in water solution having a specific gravity of 41° Baumé. As a binder zero to 30 pounds of this solution and preferably about 19½ pounds are added to 100 pounds of the dry mix. Concentration ranges of sodium silicate of 29° to 48° Baumé are suitably used. In connection with the production of the flux of the invention it is desirable to use a very low content of silica in the lime-alumina system. This means that in many cases sodium silicate should desirably be avoided as a binder. Sodium silicate can be rendered unnecessary by prefusing the flux and then subsequently crushing and screening it to the desired mesh sizes before employing it in the welding operation.

The flux after drying is screen crushed if necessary and screened to the desired size and then desirably freed from moisture by drying conveniently at 840° F. for one half to four hours.

It will be evident that the flux of the present invention can be incorporated as a coating on a stick electrode, can be added as a separate flux at the point of welding or can be incorporated as a flux in the core of a welding electrode.

All percentages herein mentioned are percentages by weight.

In view of our invention and disclosure variations and modifications to meet individual whim or particular need will doubtless become evident to others skilled in the art, to obtain all or part of the benefits of our invention without copying the method or composition shown, and we therefore claim all such insofar as they fall within the reasonable spirit and scope of our claims.

Having thus described our invention, what we claim as new and desire to secure by Letters Patent is:

1. An arc welding flux for welding nickel base alloys and wholly austenitic iron base alloys having a composition essentially as follows:

| | Percent |
|---|---|
| Fluorspar | 10 to 40 |
| Magnesium oxide | 15 to 39 |
| Aluminum oxide | 5 to 13 |
| Substantially metallic ingredients | Balance | said flux being basic when molten.

2. A flux of claim 1, in which the magnesium oxide is at least three times the aluminum oxide content.

3. An arc welding flux for welding nickel base alloys and wholly austenitic iron base alloys having a composition essentially as follows:

| | Percent |
|---|---|
| Fluorspar | 25 |
| Magnesium oxide | 27 |
| Aluminum oxide | 9 |
| Substantially metallic ingredients | Balance | said flux being basic when molten.

4. An arc welding flux for welding nickel base alloys and wholly austenitic iron base alloys having a composition essentially as follows:

| | Percent |
|---|---|
| Fluorspar | 10 to 40 |
| Limestone | up to 22 |
| Magnesium oxide | 15 to 39 |
| Aluminum oxide | 5 to 13 |
| Substantially metallic ingredients | Balance | said flux being basic when molten.

5. A flux of claim 4, in which the magnesium oxide is at least three times the aluminum oxide content.

6. An arc welding flux for welding nickel base alloys and wholly austenitic iron base alloys essentially composed of the following ingredients:

| | Percent |
|---|---|
| Fluorspar | 10 to 40 |
| Magnesium oxide | 15 to 39 |
| Aluminum oxide | 5 to 13 |
| Columbium | 1 to 5 |
| Substantially metallic ingredients | Balance | said flux being basic when molten.

7. A flux of claim 6, in which the magnesium oxide is at least three times the aluminum oxide content.

8. An arc welding flux for welding nickel base alloys and wholly austenitic iron base alloys essentially composed of the following ingredients:

| | Percent |
|---|---|
| Fluorspar | 10 to 40 |
| Magnesium oxide | 15 to 39 |
| Aluminum oxide | 5 to 13 |
| Limestone | up to 22 |
| Columbium | 1 to 5 |
| Substantially metallic ingredients | Balance | said flux being basic when molten.

References Cited by the Examiner

UNITED STATES PATENTS

| | | | |
|---|---|---|---|
| 2,576,123 | 11/51 | Kihlgren et al. | 75—171 |
| 2,671,040 | 3/54 | Holmes | 148—26 |
| 2,814,579 | 11/57 | Stringham et al. | 148—26 |
| 2,895,863 | 7/59 | Stringham et al. | 148—26 |
| 3,068,128 | 12/62 | Shrubsall et al. | 148—26 |

DAVID L. RECK, *Primary Examiner.*

RICHARD M. WOOD, WINSTON A. DOUGLAS, *Examiners.*